(12) United States Patent
Venditti et al.

(10) Patent No.: US 6,761,589 B2
(45) Date of Patent: Jul. 13, 2004

(54) PATCH PLUG DESIGN AND METHODS FOR USE THEREOF

(75) Inventors: Jay Venditti, East Lyme, CO (US); Joseph E. Dupuis, Leyard, CT (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 10/342,747

(22) Filed: Jan. 15, 2003

(65) Prior Publication Data

US 2003/0139094 A1 Jul. 24, 2003

Related U.S. Application Data

(60) Provisional application No. 60/349,911, filed on Jan. 18, 2002.

(51) Int. Cl.⁷ .............................................. H01R 13/40
(52) U.S. Cl. ........................................ 439/596; 493/941
(58) Field of Search ................................ 439/596, 404, 439/405, 417, 418, 467, 607, 608, 610, 741

(56) References Cited

U.S. PATENT DOCUMENTS

| | | | |
|---|---|---|---|
| 4,062,616 A | * 12/1977 | Shaffer et al. | 439/399 |
| 4,195,898 A | * 4/1980 | Chow et al. | 439/407 |
| 4,759,723 A | * 7/1988 | Siemon | 439/409 |
| 5,226,835 A | * 7/1993 | Baker et al. | 439/403 |
| 5,538,438 A | * 7/1996 | Orlando | 439/344 |
| 5,713,756 A | * 2/1998 | Abe | 439/404 |
| 6,290,506 B1 | * 9/2001 | Milner | 439/3 |
| 6,328,601 B1 | 12/2001 | Yip et al. | |
| 6,368,144 B2 | 4/2002 | Viklund | |

FOREIGN PATENT DOCUMENTS

| | | |
|---|---|---|
| EP | 1150389 | 10/2001 |
| WO | WO 01/11731 | 2/2001 |

OTHER PUBLICATIONS

Lucent product literature, "4 Pair Patch–Cord Plug," Jan. 27, 1999 (internal date).

* cited by examiner

Primary Examiner—P. Austin Bradley
Assistant Examiner—Edwin A. Leon
(74) Attorney, Agent, or Firm—McCarter & English, LLP (57) ABSTRACT

A patch plug is provided that facilitates field installations thereof, e.g., using conventional equipment such as a conventional punch tool. Preferred patch plugs according to the present disclosure include a cover and a housing, each of which includes a hinge member to facilitate relative rotations of portions of the housing and cover. Rotational/pivotal motion of the cover and the housing relative to the disclosed hinge members facilitates establishing electrical connection with terminals positioned therewithin. The terminals that may be positioned in alternating pairs to provide improved return loss, and printed circuit boards are provided for further improved performance.

17 Claims, 11 Drawing Sheets

TOP TRACE

BOTTOM TRACE

*Fig. 12*

PATCH PLUG DESIGN AND METHODS FOR USE THEREOF

CROSS-REFERENCE TO RELATED APPLICATIONS

The present application claims the benefit of a commonly assigned, provisional patent application entitled "Patch Plug Design and Methods for Use Thereof," which was filed on Jan. 18, 2002, and assigned Ser. No. 60/349,911. The entire contents of the foregoing provisional patent application are hereby incorporated by reference.

BACKGROUND OF THE DISCLOSURE

1. Technical Field

The present disclosure relates to innovative patch plug designs that facilitate, inter alia, easy and effective connector termination in the field.

2. Background Art

Patch plug designs for use with patch cords, e.g., conventional cables that include a plurality of twisted pair wires, are known. For example, Lucent Technologies (Morristown, N.J.) provides a patch plug/patch cord assembly that is fabricated from top and bottom patch plug housings. The top and bottom housings (also referred to as "base" and "cover" housings) include cooperative latching fingers/slots that are employed to establish and maintain the respective housings in fixed alignment after the wires from the patch cord are properly positioned therebetween. Of note, each housing is substantially planar in design, and the units available from Lucent Technologies are fabricated in a factory environment. Thus, the commercially available units according to the Lucent design include patch plugs that are pre-secured to patch cords, such that the patch cords extend from the patch plugs when purchased by potential users thereof.

In view of the ever-increasing breadth and complexity of wiring applications, it would be highly desirable to provide a patch plug design that facilitates enhanced flexibility in implementation and use. In particular, it would be advantageous to provide a patch plug design that would facilitate easy and effective field wiring thereof. Additionally, a patch plug design that provides/facilitates enhanced performance, e.g., reduced NEXT and FEXT noises, would be desirable.

These and other objectives are achieved, either individually or collectively, through the advantageous patch plug designs and methods disclosed herein.

SUMMARY OF THE DISCLOSURE

According to the present disclosure, innovative patch plug designs are provided that facilitate, inter alia, easy and effective connector termination in the field. Exemplary embodiments of the disclosed patch plugs may be advantageously installed in the field using conventional equipment, e.g., a conventional punch tool.

The advantageously disclosed patch plug designs effectively address inherent space constraints to facilitate connection between a series of insulation displacement connectors ("IDCs") and a wire, e.g., a twisted pair cable, to form an advantageous patch cord. In preferred embodiments of the present disclosure, the disclosed patch plug includes a printed circuit board having proprietary features to provide enhanced performance (e.g., to achieve reduced near end crosstalk). The present disclosure also relates to advantageous field implementations utilizing the disclosed patch plug designs.

Preferred patch plugs according to the present disclosure include:

(a) a cover that includes a first hinge member at an intermediate position of the cover;
(b) a housing that includes a second hinge member at an intermediate position of the housing;
(c) a plurality of towers extending from the housing; and
(d) IDC features positioned between adjacent pairs of the plurality of towers.

According to the present disclosure, rotational/pivotal motion of the cover and the housing relative to the first and second hinge members facilitates establishing electrical connection between wires and the IDCs. Preferred patch plugs according to the present disclosure include hinge members that are living hinges, terminals that are positioned in alternating pairs to provide improved return loss, and terminals that are fabricated with associated contact blades, compliant eyes, and IDCs (or IPCs) incorporated into an integral member to contribute to improved performance of such patch plug.

These and other unique features of the disclosed systems, devices and methods of the present disclosure will become more readily apparent from the drawings taken in conjunction with the detailed description of preferred and exemplary embodiments provided herein.

BRIEF DESCRIPTION OF THE DRAWINGS

So that those having ordinary skill in the art to which the subject disclosure appertains will more readily understand how to construct and employ the subject disclosure, reference may be had to the drawings wherein.

These and other features of the disclosed patch plug device and methods for use thereof will become more readily apparent to those having ordinary skill in the art from the following detailed description of preferred and exemplary embodiments.

DETAILED DESCRIPTION OF PREFERRED EMBODIMENT(S)

Referring now to the drawings, FIGS. 1–12 illustrate aspects of an exemplary patch plug embodiment in accordance with the present disclosure. In each of the referenced figures, the exemplary patch plug embodiments of the present disclosure are shown without cabling/wiring attached and/or integrated therewith. As will be readily apparent to persons skilled in the art, wiring of the exemplary patch plugs as disclosed herein may be accomplished using conventional equipment, e.g., using conventional punch tools in a field environment. Preferred and exemplary wiring/trace arrangements for enhanced performance according to the present disclosure are also disclosed herein.

Figure 1:
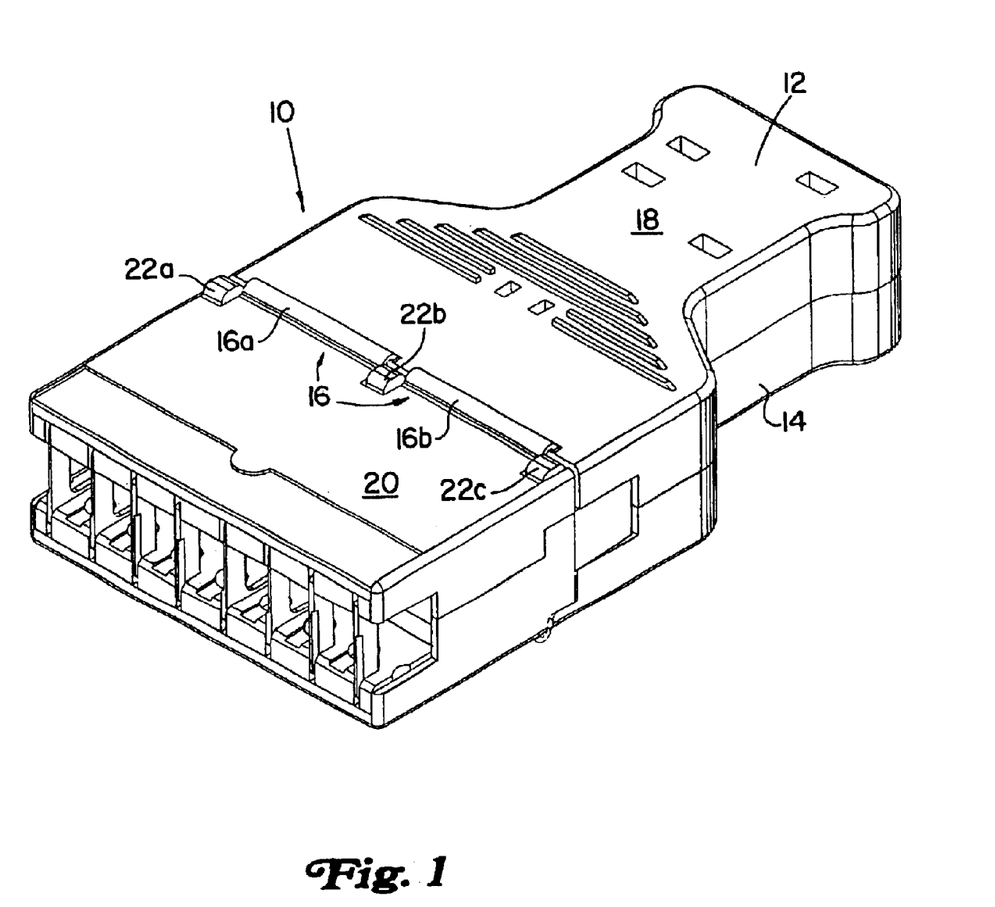
FIG. 1 is a perspective view of an exemplary patch plug device in accordance with the present disclosure.
Figure 2:
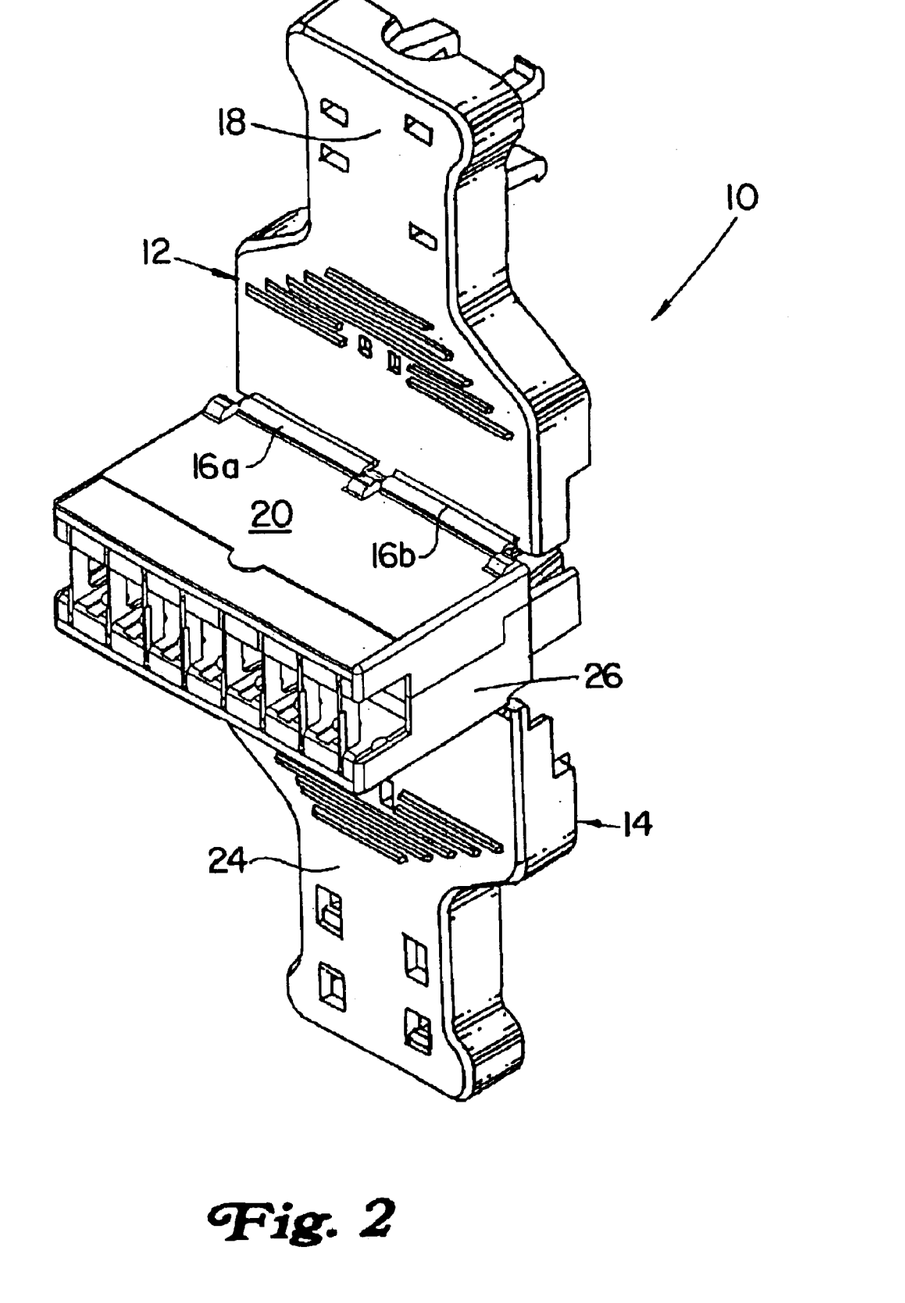
FIG. 2 is a perspective view of the exemplary patch plug device of FIG. 1, wherein portions of the patch plug housings have been reoriented according to preferred aspects of the present disclosure.

With particular reference to FIGS. 1 and 2, an exemplary patch plug 10 is depicted that includes a cover 12 and a lower housing 14. Cover 12 and lower housing 14 define substantially identical geometries so that, when mated, they form a substantially integral patch plug unit as shown in FIG. 1. As described in greater detail hereinbelow, cover 12 includes a hinge member 16 at an intermediate location, hinge member 16 defining rear cover portion 18 and front cover portion 20. As shown, hinge member 16 comprises two individual hinge members 16a, 16b that are bounded by apertures through which latching fingers 22a, 22b, 22c protrude. As is apparent from FIG. 6, latching fingers 22a, 22b, 22c extend upwardly from lower housing 14 and assist in securing lower housing 14 to cover 12. As will be apparent to persons skilled in the art, hinge member 16 may take the form of a single hinge member, dual hinge members (as shown), or greater numbers of individual hinge members, without departing from the spirit and scope of the present disclosure.

Figure 3:
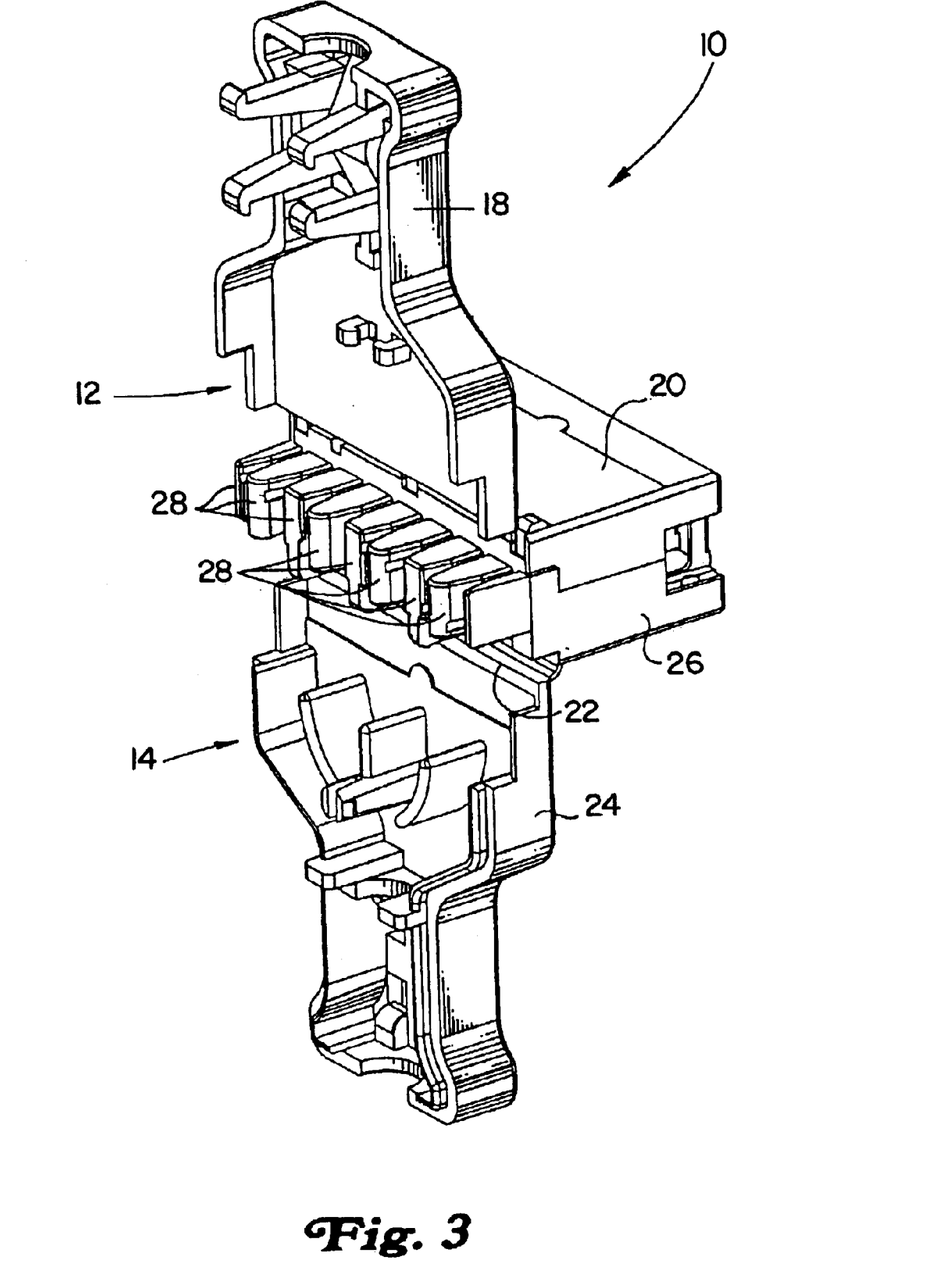
FIG. 3 is a further perspective view of the exemplary patch plug device of FIG. 1, wherein portions of the patch plug housings have been reoriented according to preferred aspects of the present disclosure.
Figure 4:
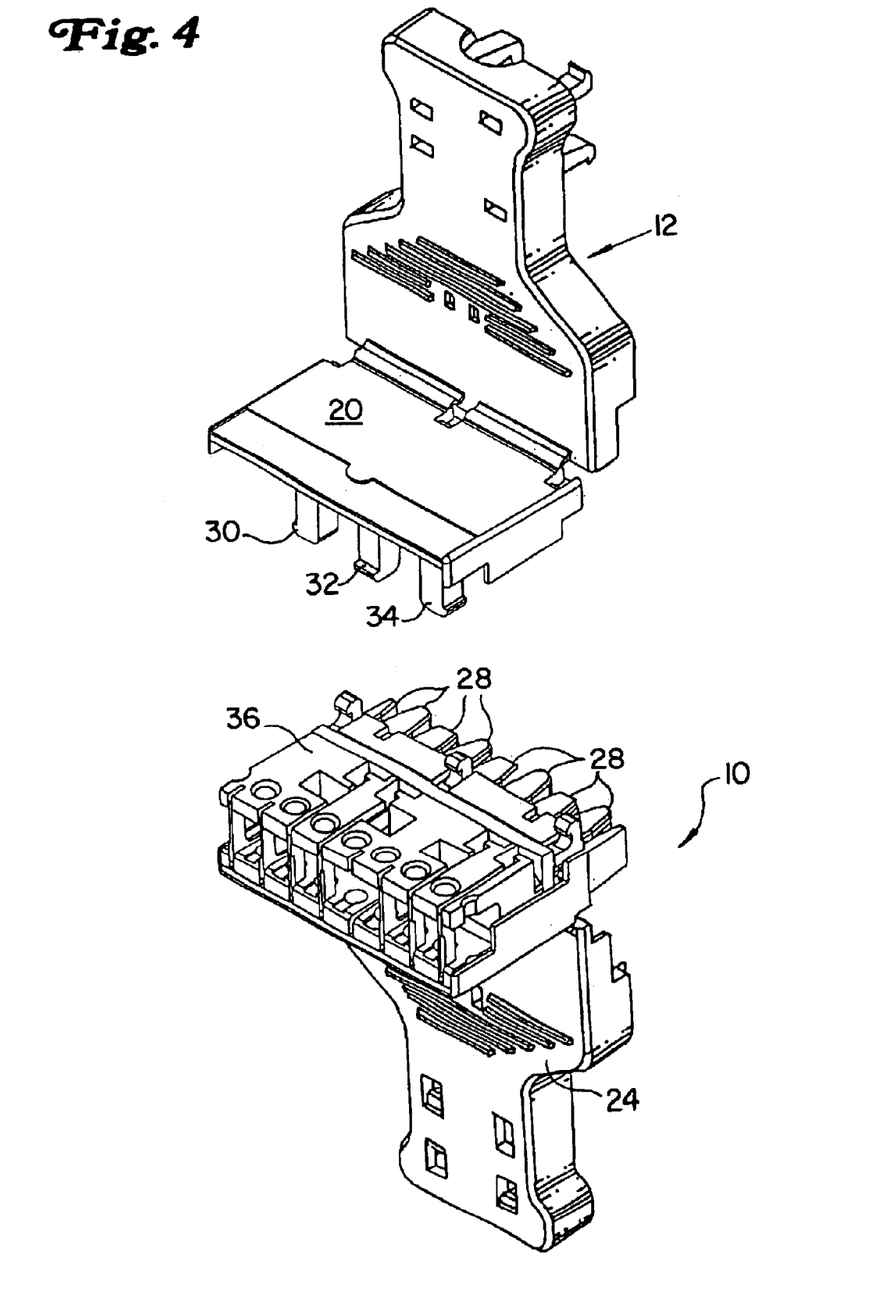
FIG. 4 is a perspective view of the exemplary patch plug device of FIG. 1, wherein portions of the patch plug housings have been reoriented and, as compared to the prior view of FIG. 2, the respective housings have been separated.

As shown in FIGS. 2–4, lower housing 14 of exemplary patch plug 10 also includes a complementary hinge member 22 at an intermediate location thereof, such complementary hinge member 22 defining rear housing portion 24 and front housing portion 26. In preferred embodiments of the present disclosure, hinge member 16 and complementary hinge member 22 are at substantially identical intermediate locations relative to cover 12 and lower housing 14, respectively. Thus, pivotal or rotational motion of front cover portion 18 relative to rear cover portion 20, and pivotal or rotational motion of front housing portion 24 relative to rear housing portion 26, takes place around or relative to substantially aligned rotational axes. According to preferred embodiments of the present disclosure, hinge members 16, 22 are living hinges.

The pivotal/rotational functionalities associated with cover 12 and housing 14 according to the present disclosure are highly advantageous in permitting/facilitating patch plug installations in the field. More particularly, by pivoting/rotating front housing portion 24 and front cover portion 18 to the relative positions shown in FIGS. 2, 3 and 7, field personnel can easily and efficiently introduce/mount wires from a desired cable into exemplary patch plug 10, e.g., using a conventional punch tool. Field installation is particularly facilitated because punch tool access is facilitated from both sides of towers 28 formed in or extending from housing 14. By facilitating field installation of patch plugs onto cable(s), the present disclosure greatly enhances the flexibility and efficiency associated with as wide range of wiring applications.

Turning to FIG. 4, exemplary patch plug 10 is depicted with cover 12 separated from lower housing 14. As shown therein, latch members 30, 32, 34 extend downwardly from rear cover portion 20 of cover 12. Each latch member 30, 32, 34 includes a latching finger at the exposed end thereof, such latching finger adapted to engage apertures formed in lower housing 14 (see apertures 60a, 60b, 60c in FIG. 8) by passing through corresponding slots formed in spacer 36 that is mounted to rear housing portion 24 of housing 12. Thus, when latch members 30, 32, 34 are engaged with the apertures 60a, 60b, 60c formed in housing 14, the rear cover portion 20 is secured to the corresponding rear housing portion 26 of housing 14. However, front cover portion 18 and front housing portion 24 maintain rotational/pivotal freedom of motion around the substantially aligned rotational axes defined by hinge member 16 and complementary hinge member 22.

The degree to which front cover portion 18 and front housing portion 24 maintain rotational/pivotal freedom of motion can vary according to the present disclosure. It is contemplated that the degree of rotational/pivotal freedom of motion is such that field personnel are allowed to easily and effectively achieve patch plug/wire installations using conventional punch tooling. Thus, in a preferred embodiment of the present disclosure, rotational/pivotal freedom of motion is such that both front cover portion 18 and front housing portion are able to rotate/pivot at least 90° relative to their respective rotational/pivotal axes. Patch plug designs with greater and/or lesser degrees of rotational/pivotal freedom of motion may be provided according to the present disclosure, so long as advantageous field installations are enabled thereby.

Figure 5:
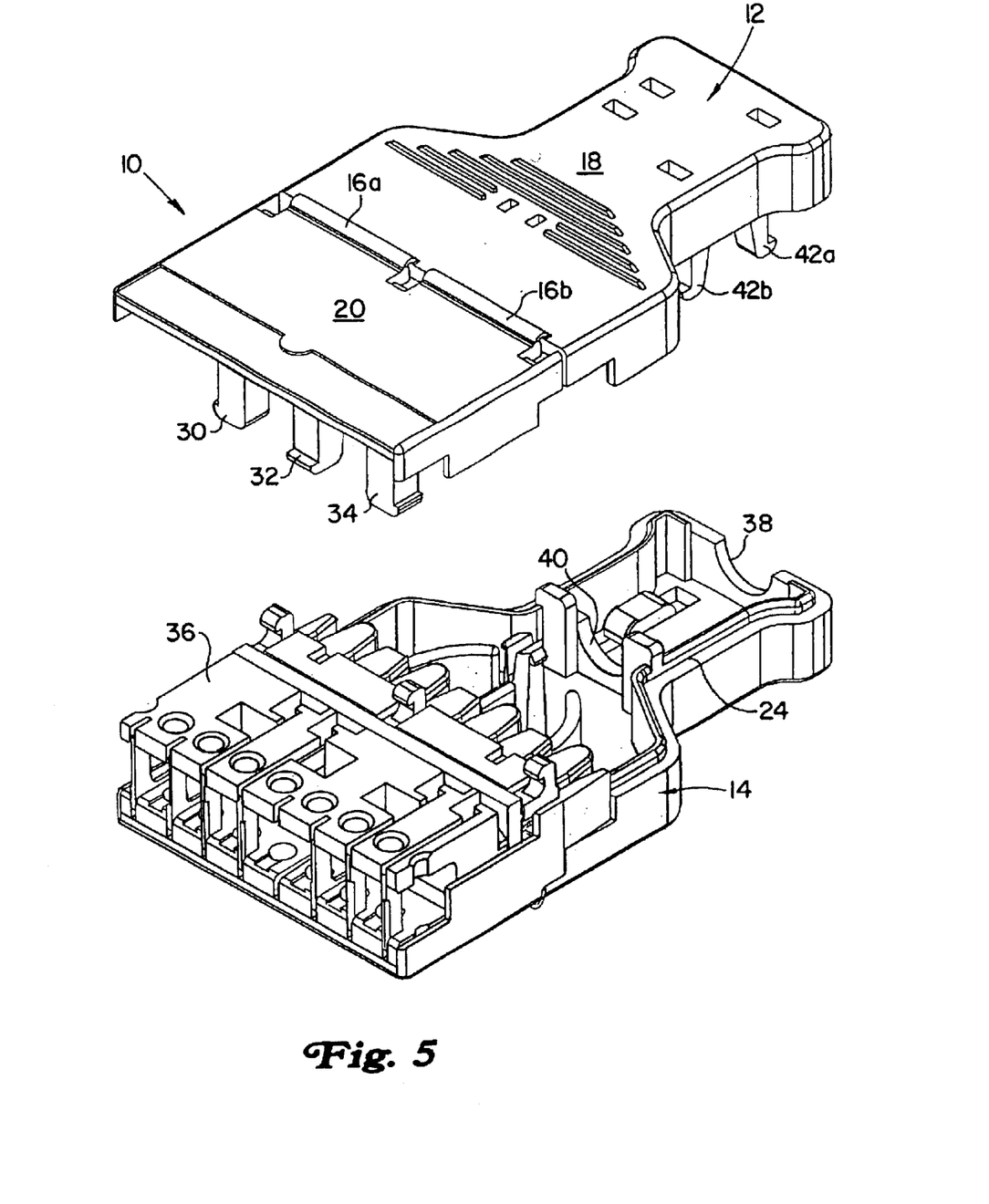
FIG. 5 is an additional perspective view of the exemplary patch plug device of FIG. 1, wherein the respective housings have been separated.

With reference to FIG. 5, a further view of exemplary patch plug 10 is provided wherein cover 12 is separated from lower housing 14. As is apparent from the perspective view of FIG. 5, a cable (not pictured) can be positioned within patch plug 10 by passing through an outer passage formed by cooperative semi-circular cutouts 38 formed in cover 12 and lower housing 14. A further set of semi-circular supporting walls 40 are formed within the interior of cover 12 and lower housing 14 to further stabilize and capture a cable (not pictured) positioned therewithin. Downwardly extending latching fingers 42a, 42b protrude from cover 12 and are adapted to engage cooperative slots formed in lower housing to secure front cover portion 18 to front housing portion 24.

Figure 6:
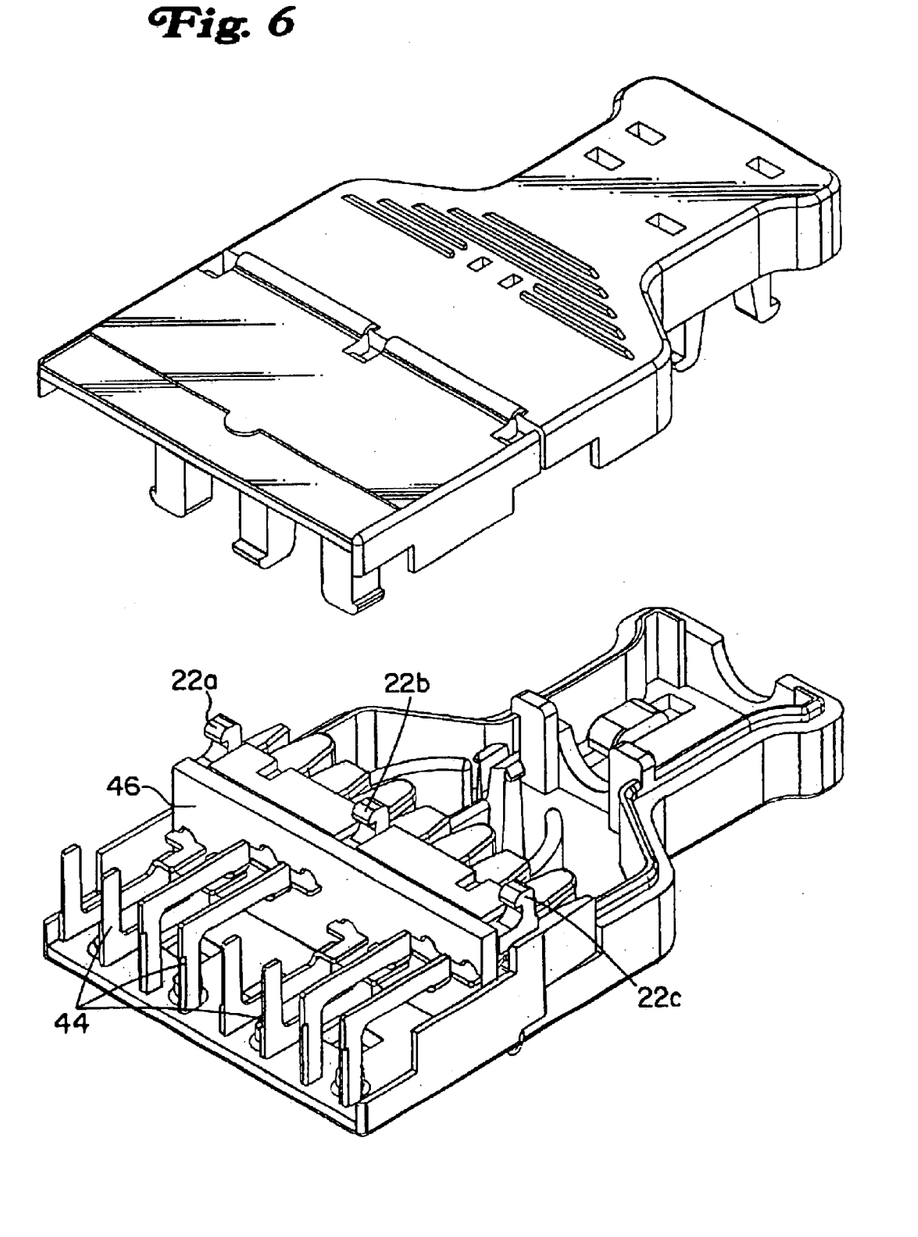
FIG. 6 is a further perspective view of the exemplary patch plug device of FIG. 1, similar to the prior view of FIG. 5, wherein the respective housings have been separated and the exemplary spacer removed.
Figure 10:
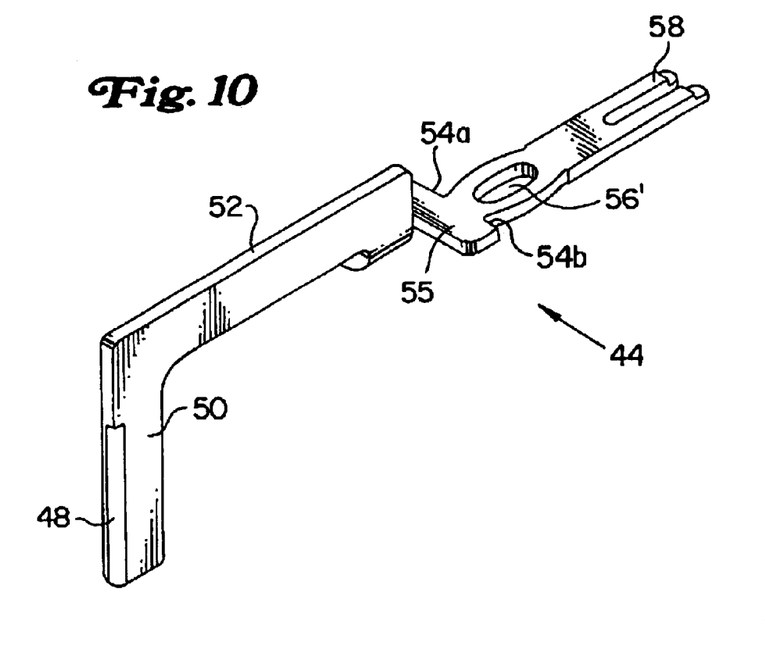
FIG. 10 is a perspective view of an exemplary terminal with IDCs according to the present disclosure.

With reference to FIGS. 5 and 6, the manner in which spacer 36 cooperates with a plurality of terminals 44 and lower housing 14 according to an exemplary embodiment of the present disclosure is depicted. As shown therein, spacer 36 assists in stabilizing terminals 44 as they extend through substantially rectangular printed circuit board (PCB) 46. As shown in FIG. 10, an exemplary, substantially L-shaped terminal 44 according to the present disclosure is depicted. Terminal 44 features a contact blade feature 48 on leg portion 50 for mating with a corresponding connector, e.g., an IDC feature on a 110C-4 clip, as is known in the art. Leg portion 50 is preferably integrally formed with extension 52, and includes a transverse extension 55 that defines abutment shoulders 54a, 54b. Compliant eye 56 and a terminating insulation displacement connector (IDC) feature 58 for mating with individual wires are also provided. Due to transverse extension 55, compliant eye 56 and IDC feature 58 are rotated approximately 90° relative to the orientation of leg portion 50 and extension 52.

Figure 11:
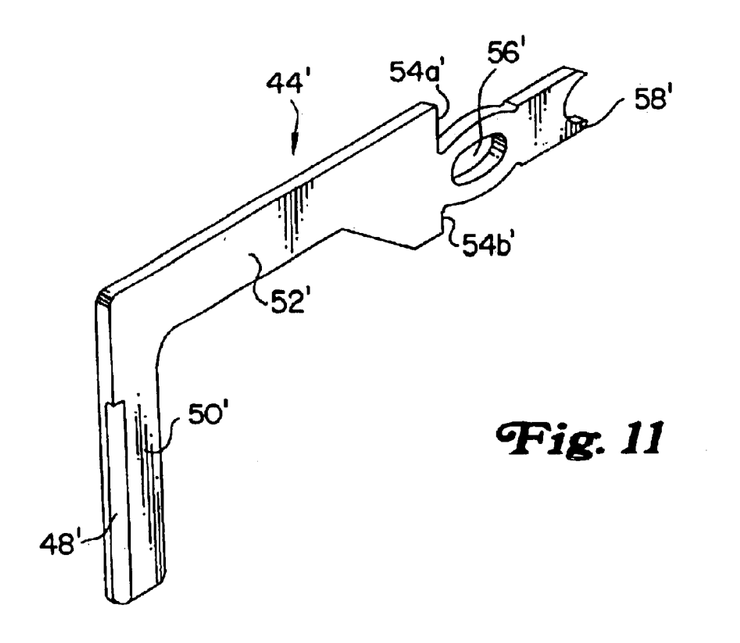
FIG. 11 is a perspective view of an exemplary and alternative terminal with insulation piercing connector ("IPC") feature according to the present disclosure.

With reference to FIG. 11, an alternative, substantially L-shaped terminal 44' is depicted, such alternative terminal 44' including a contact blade feature 48' on leg portion 50' for mating with a corresponding connector. Leg portion 50' is preferably integrally formed with extension 52' that defines abutment shoulders 54a', 54b', a compliant eye 56', and a terminating insulating piercing connector (IPC) feature 58'. As compared to terminal 44, terminal 44' lacks a transverse aspect (e.g., transverse extension 55) and therefore compliant eye 56' and IPC feature 58' of IDC 44' are not rotated relative to the orientation of leg portion 50' and extension 52'.

Terminals 44, 44' are fabricated from an appropriate conductive material, as is known in the art. By fabricating terminals 44, 44' such that the contact blade, compliant eye and IDC (or IPC) are incorporated into a single, integral component, potential performance degradations are avoided, and optimal performance may be preferably achieved according to preferred embodiments of the present disclosure.

With further reference to FIGS. 5 and 6, according to a preferred embodiment of the present disclosure, terminals 44, 44' are positioned in alternating pairs, such that a first pair of terminals 44, 44' are positioned such that leg portions 50, 50' are downwardly positioned, i.e., directed into lower housing 14; the next pair of terminals 44, 44' are positioned with leg portions upwardly directed, i.e., away from lower housing 14; etc. Through the implementation of alternating terminal pairs, as described herein, return loss performance is improved. Moreover, through implementation of innovative noise reduction technologies disclosed herein, additional performance characteristics are improved, e.g., reduced crosstalk. Accordingly, overall patch plug performance may be improved in key respects according to preferred embodiments of the present disclosure.

Figure 8:
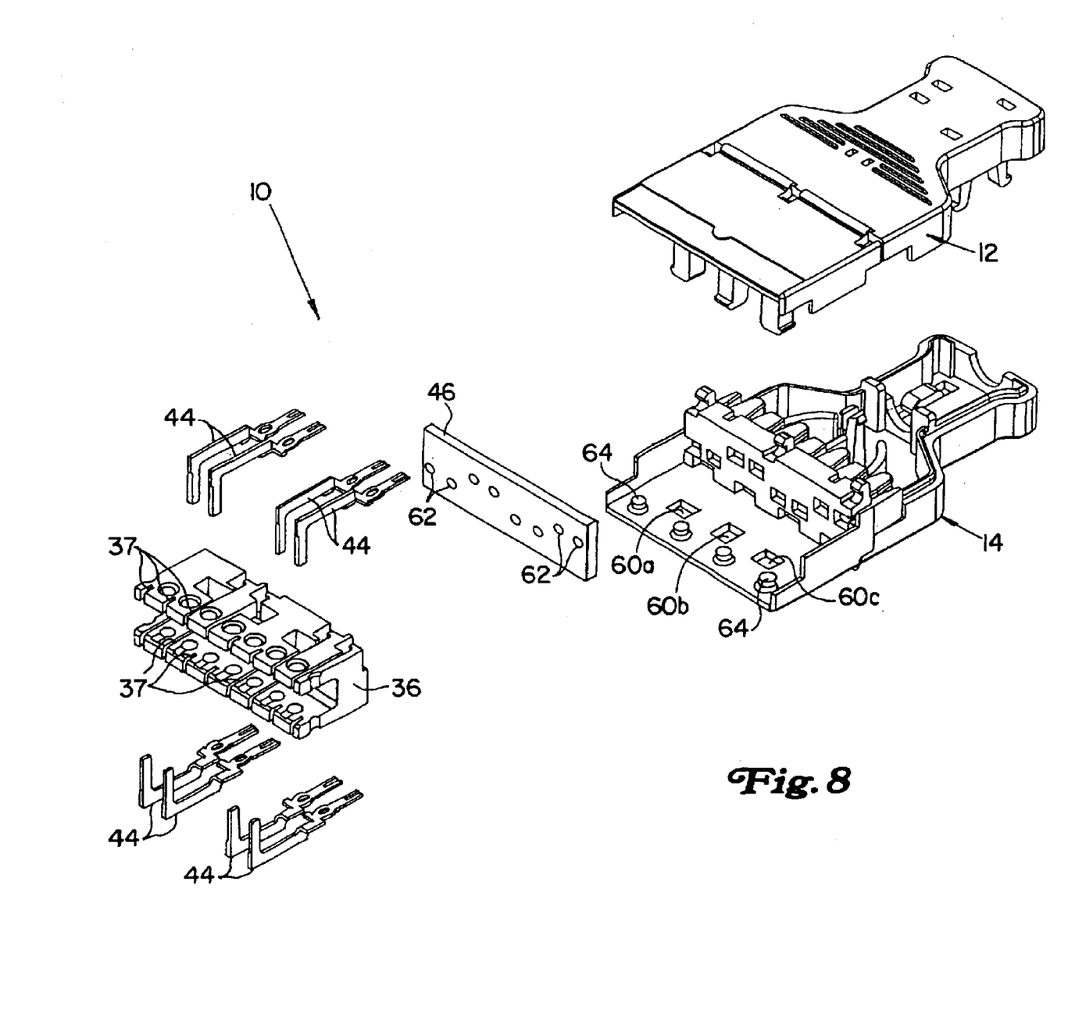
FIG. 8 is an exploded perspective view of an exemplary patch plug device according to the present disclosure.
Figure 9:
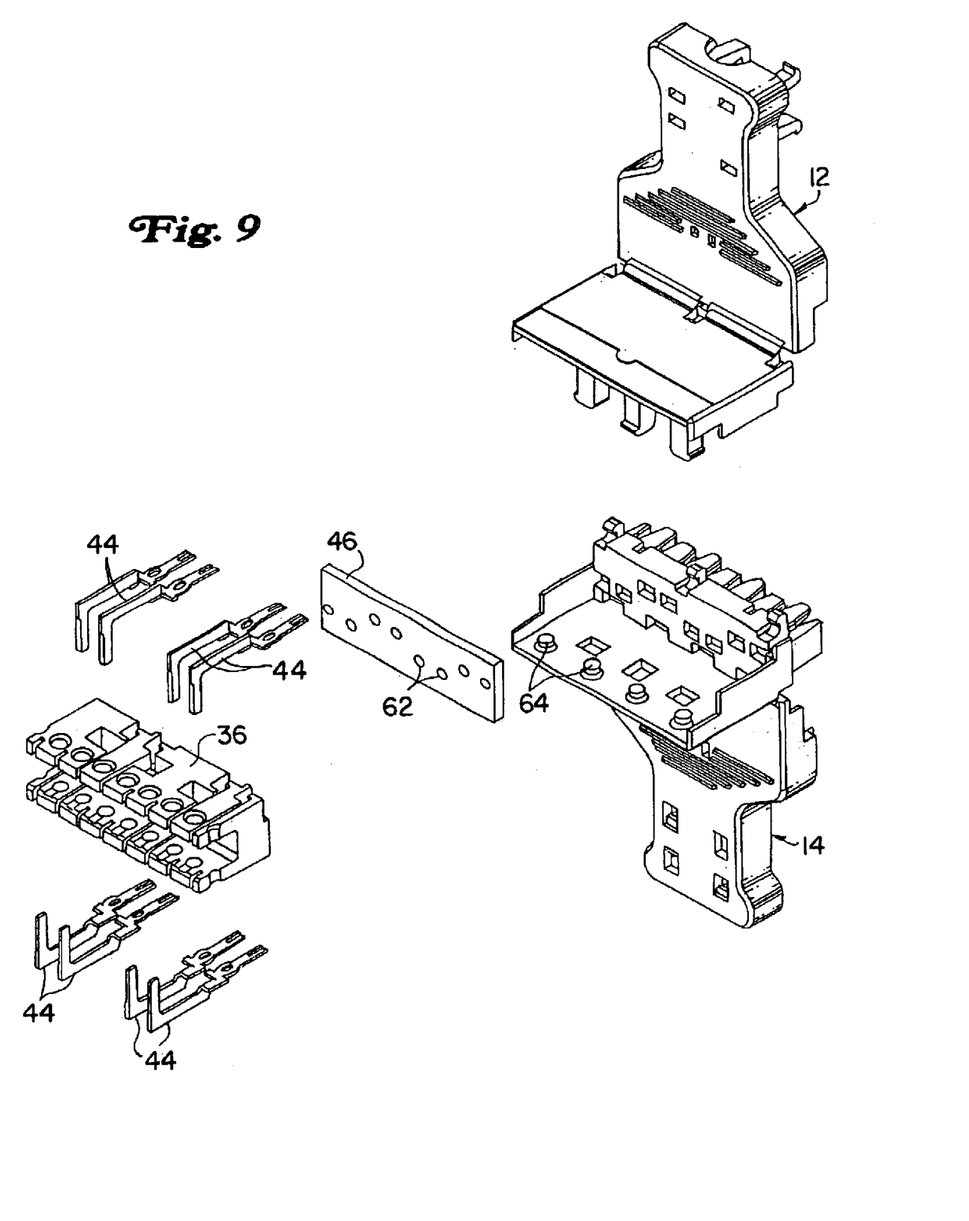
FIG. 9 is a further exploded perspective view of an exemplary patch plug device according to the present disclosure, wherein portions of the patch plug housings have been reoriented according to preferred aspects of the present disclosure.

With reference to the exploded views of FIGS. 8 and 9, the cooperation between alternating terminal pairs 44 and PCB 46 is further illustrated. Thus, PCB 46 includes pairs of spaced openings 62 that are adapted to accommodate partial passage of terminal pair extensions 52 therethrough. Abutment shoulders 54a, 54b typically engage PCB 46 to position terminals 44 relative thereto, at which point compliant eyes 54 are typically positioned within PCB 46 and make reliable electrical connection therewith. Through electrical cooperation with PCB 46, the optimal performance of an exemplary patch plug 10 of the present disclosure may be achieved. IDC features 58 extend from the opposite side of PCB 46 for electrical connection with wires (not pictured) positioned within exemplary patch plug 10.

As is further apparent from the exploded views of FIGS. 8 and 9, lower housing 14 includes a plurality of spaced, upwardly protruding studs 64 that cooperate with corresponding apertures formed in spacer 36 to position spacer 36 relative to lower housing 14. Similar downwardly protruding studs (not pictured) extend from cover 12 and engage corresponding apertures formed in spacer 36 for further stabilization thereof. Spacer 36 defines a plurality of spaced channels 37 within which terminals 44, 44' are positioned to further stabilize and secure terminals 44 relative to exemplary patch plug 10. In a preferred embodiment of the present disclosure, channels 37 are provided in alternating pairs, such that a first set of adjacent pair of channels 37 on an upper portion of spacer 36 are elongated, so as to cooperate with extensions 52 of terminals 44, whereas the next pair of channels 37 in the upper portion of spacer 36 are relatively short, and are intended for cooperation with leg portions 50 of terminals 44. Thus, spacer 36 and channels 37 are preferably fabricated so as to cooperate with the alternating terminal pair scheme described herein.

With reference to FIGS. 6, 8, 9 and 12, trace layouts or patterns associated with exemplary PCB 46 advantageously provide reduced crosstalk (e.g., NEXT and FEXT) noises in patch plugs according to the present disclosure. PCB 46 thus exhibits advantageous balance coupling to reduce noise and re-balance the signal without negatively impacting the impedance characteristics of the-wire pairs in a simple and low cost manner. Electrical noise is reduced by the positional relationship of signals during passage through the PCB, which advantageously compensates for pair to pair NEXT, FEXT and impedance. According to preferred-embodiments of the present disclosure, the current-carrying signal does not pass through the PCB positioned within the patch plug.

Figure 12:
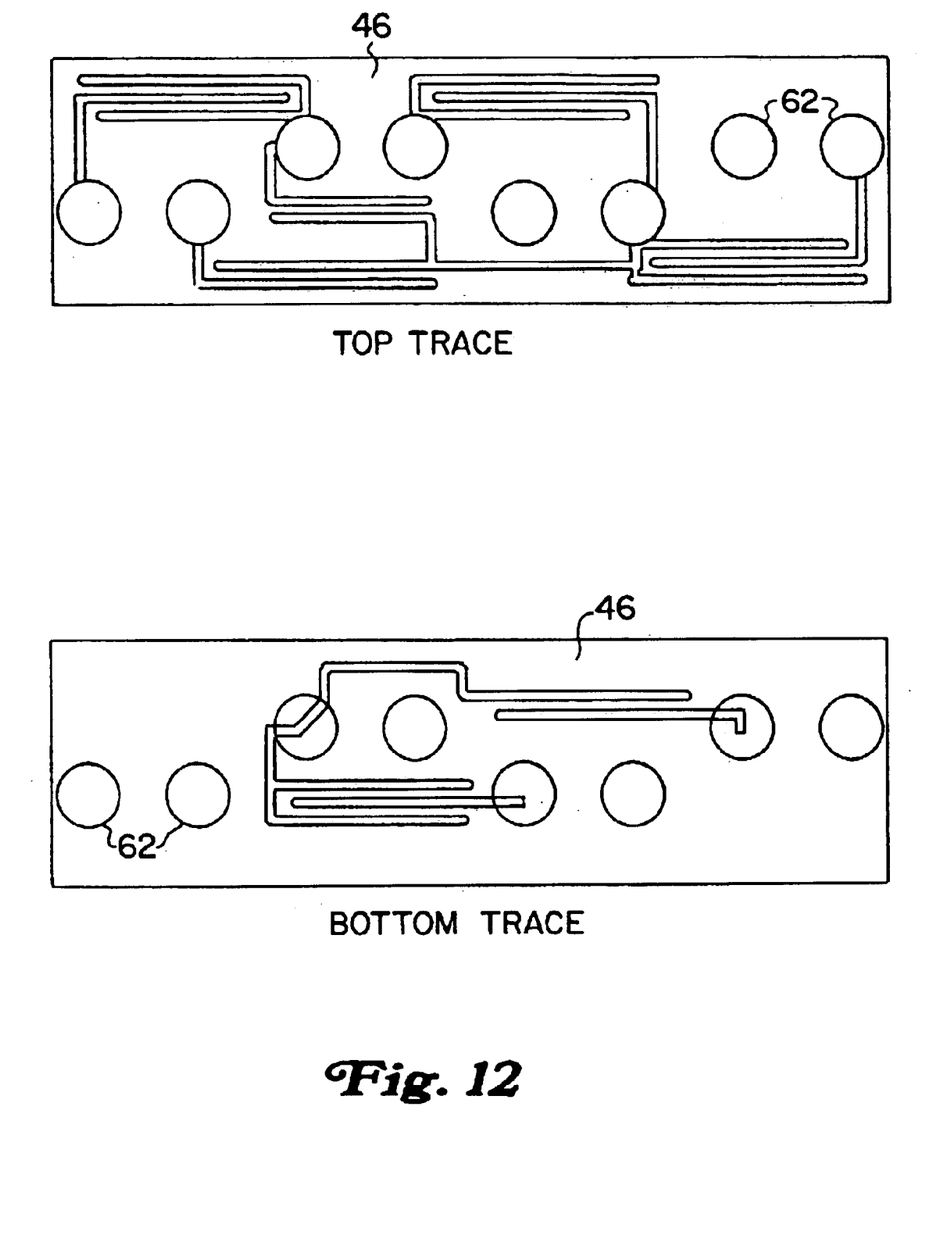
FIG. 12 is a plan view of an exemplary trace layout for a printed circuit board for use according to the present disclosure.

Exemplary trace layouts or patterns according to the present disclosure are apparent from the schematic illustrations of FIG. 12. Alternative trace layouts and/or patterns are contemplated and may be used to achieve the desired results disclosed herein. In summary, the traces in PCB 46 re-balance the wire pairs/terminals by inducing both negative and positive coupling to the adjacent pair wires/terminals.

Figure 7:
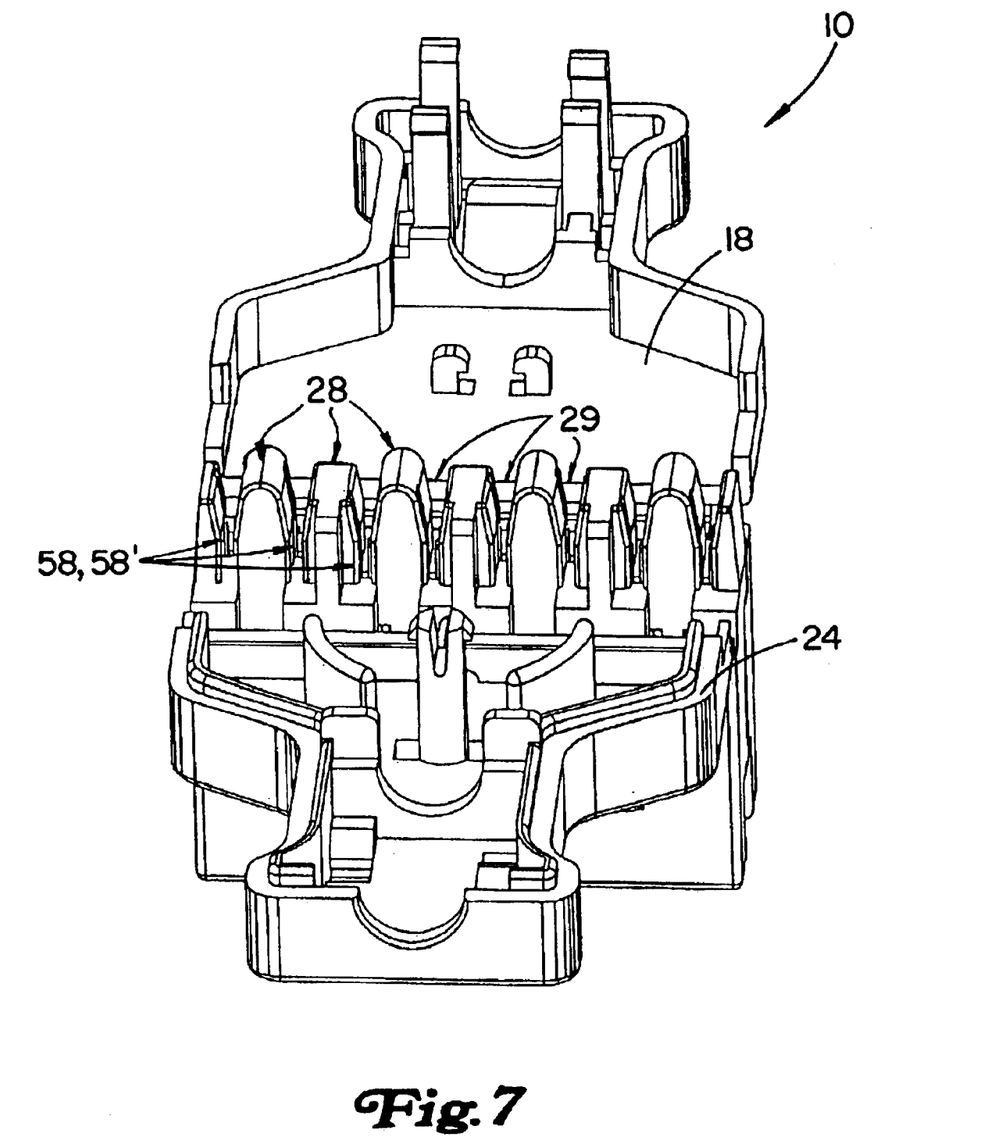
FIG. 7 is a top view of an exemplary housing and cover in the orientation of FIG. 3.

Turning to FIG. 7, an important, unique and advantageous aspect of exemplary patch plug designs of the present disclosure is further illustrated. As shown in FIG. 7, the contents of rear cover portion 18 and rear housing portion 24 are fully visible and accessible when rear cover portion 18 and rear housing portion 24 are rotated/pivoted relative to their respective hinge members. Based on such rotational/pivotal orientation of rear cover portion 18 and rear housing portion 24, towers 28 extend upwardly from rear housing portion 24 and are fully visible and accessible. Moreover, the IDC features 58 (or IPC features 58') are positioned in channels 29 formed between towers 28 and are fully accessible for electrical connection with wires (not pictured) that may be easily and efficiently positioned in contact therewith, e.g., using a conventional punch tool.

Through the advantageous deployment of towers 28 within lower housing 14, e.g., as shown in exemplary patch plug 10, and the rotational/pivotal functionality of cover 12 and lower housing 14, field installations using patch plug 10 and conventional instrumentation, e.g., a conventional punch tool, are readily achievable. Thereafter, rear cover portion 18 and rear housing portion 24 may be rotated/pivoted toward each other and latched together, thereby completing the field installation thereof.

Thus, the present disclosure provides advantageous patch plug designs, and method for use thereof, that facilitate field installations using conventional instruments/equipment. Moreover, a system, device and method for reducing crosstalk noise without requiring new equipment or expensive re-wiring is provided. Crosstalk noise may be significantly reduced or even eliminated according to preferred embodiments of the present disclosure by a combination of appropriately placed positive feedback signal reactance circuitry and by utilizing a noise balancing dual reactance dielectric insert.

Although the exemplary patch plug designs disclosed herein, and the associated methods for use thereof, have been described with respect to preferred embodiments, it should be readily apparent to persons skilled in the art that modifications and changes may be made thereto without departing from the spirit and scope of the invention as defined by the appended claims.

What is claimed is:

1. A patch plug, comprising:
   (a) a cover that includes a first hinge member defining a front cover portion and a rear cover portion;
   (b) a housing that includes a second hinge member defining a front housing portion and a rear housing portion;
   (c) a plurality of terminals mounted with respect to at least one of said cover and said housing;
   (d) at least one spacer for stabilizing said plurality of terminals with respect to at least one of said cover and said housing;
   wherein rotational motion of said rear cover portion relative to said front cover portion around said first hinge member and rotational motion of said rear housing portion relative to said front housing portion around said second hinge member facilitates access to said plurality of terminals for electrical connection.

2. A patch plug according to claim 1, wherein a plurality of spaced towers are formed in said housing, and further wherein said IDCs are positioned between said spaced towers.

3. A patch plug according to claim 1, wherein said first hinge member and said second hinge member are living hinges.

4. A patch plug according to claim 1, further comprising latching structure for latching said cover to said housing.

5. A patch plug according to claim 1, wherein said plurality of terminals define IDCs at a first end thereof.

6. A patch plug according to claim 1, wherein each of said plurality of terminals is substantially L-shaped, and wherein said L-shaped terminals are mounted in alternating pairs with respect to at least one of said cover and said housing.

7. A patch plug according to claim 1, wherein each of said plurality of terminals is substantially L-shaped, and further comprising a printed circuit board with spaced apertures for receiving said plurality of terminals therethrough.

8. A patch plug according to claim 1, wherein each of said plurality of terminals is integrally fabricated with a contact blade, a compliant eye and an IDC.

9. A patch plug according to claim 1, wherein said first hinge member is positioned at an intermediate location on said cover, and wherein said second hinge member is positioned at an intermediate location on said housing.

10. A patch plug according to claim 1, wherein said front cover portion is adapted to rotate at least 90° relative to said rear cover portion around said first hinge member, and said front housing portion is adapted to rotate at least 90° relative to said rear housing portion around said second hinge member.

11. A patch plug according to claim 1, wherein each of said plurality of terminals includes an IDC at an end thereof, and wherein each of said plurality of terminals is mounted with respect to at least one of said cover and said housing such that said IDC is exposed for electrical connection when said front cover portion is rotated relative to said rear cover portion around said first hinge member, and when said front housing portion is rotated relative to said rear housing portion around said second hinge member.

12. A patch plug, comprising:
   (a) a cover that includes a first hinge member defining a front cover portion and a rear cover portion;
   (b) a housing that includes a second hinge member defining a front housing portion and a rear housing portion;
   (c) a plurality of L-shaped terminals mounted with respect to at least one of said cover and said housing;
   (d) at least one spacer for stabilizing said plurality of terminals with respect to at least one of said cover and said housing;
   (e) a printed circuit board with spaced apertures for receiving said plurality of terminals therethrough wherein traces associated with said printed circuit are oriented so as to contribute to reduced cross talk;
   wherein rotational motion of said rear cover portion relative to said front cover portion around said first hinge member and rotational motion of said rear housing portion relative to said front housing portion around said second hinge member facilitates access to said plurality of terminals for electrical connection.

13. A method for wiring a patch plug, comprising:
   (a) providing a patch plug that includes:
      (i) a cover including a first hinge member defining a front cover portion and a rear cover portion,
      (ii) a housing including a second hinge member defining a front housing portion and rear housing portion; and
      (iii) a plurality of terminals mounted with respect to at least one of said cover and said housing;
   (b) rotating said front cover portion relative to said rear cover portion around said first hinge member;
   (c) rotating said front housing portion relative to said rear housing portion around said second hinge member;
   (d) connecting at least one wire with respect to at least one of said plurality of terminals.

14. A method according to claim 13, wherein each of said plurality of terminals includes an IDC, and said at least one wire is connected with respect to said IDC.

15. A method according to claim 13, further comprising:
   (e) rotating said front housing portion and said front cover portion into engagement with each other; and
   (f) latching said front housing portion and said front cover portion to each other.

16. A method according to claim 13, further comprising utilizing a punch tool to facilitate connect of said at least one wire with respect to said at least one of said plurality of terminals.

17. A method according to claim 13, wherein said patch plug assumes a substantially T-shaped orientation when said housing and said cover are rotated.

* * * * *

UNITED STATES PATENT AND TRADEMARK OFFICE
CERTIFICATE OF CORRECTION

PATENT NO. : 6,761,589 B2  Page 1 of 1
DATED : July 13, 2004
INVENTOR(S) : Jay Venditti and Joseph E. Dupuis It is certified that error appears in the above-identified patent and that said Letters Patent is hereby corrected as shown below:

Column 3,
Lines 32 and 33, please correct "rear cover portion 18 and front cover portion 20" to read -- front cover portion 18 and rear cover portion 20 --.
Lines 47 and 48, please correct "rear housing portion 24 and front housing portion 26" to read -- front housing portion 24 and rear housing portion 26 --.

Column 6,
Line 33, please correct "rear cover portion 18 and rear housing portion 24" to read -- front cover portion 18 and front housing portion 24 --.
Lines 34 and 35, please correct "rear cover portion 18 and rear housing portion 24" to read -- front cover portion 18 and front housing portion 24 --.
Lines 37 and 38, please correct "rear cover portion 18 and rear housing portion 24" to read -- front cover portion 18 and front housing portion 24 --.
Lines 38 and 39, please correct "rear housing portion 24" to read -- front housing portion 24 --.

Column 7,
Lines 18 to 22, please correct "rear cover portion relative to said front cover portion around said first hinge member and rotational motion of said rear housing portion relative to said front housing portion" to read -- front cover portion relative to said rear cover portion around said first hinge member and rotational motion of said front housing portion relative to said rear housing portion --.

Signed and Sealed this

Twenty-second Day of February, 2005

JON W. DUDAS
*Director of the United States Patent and Trademark Office*